US009853575B2

(12) United States Patent
Stang et al.

(10) Patent No.: US 9,853,575 B2
(45) Date of Patent: Dec. 26, 2017

(54) ANGULAR MOTOR SHAFT WITH ROTATIONAL ATTENUATION

(71) Applicant: Hand Held Products, Inc., Fort Mill, SC (US)

(72) Inventors: Jean-Pierre Stang, Auzeville-Tolosane (FR); Jean-Michel Puech, Toulouse (FR); Khalid El Akel, Castanet-Tolosan (FR)

(73) Assignee: Hand Held Products, Inc., Fort Mill, SC (US)

( * ) Notice: Subject to any disclaimer, the term of this patent is extended or adjusted under 35 U.S.C. 154(b) by 77 days.

(21) Appl. No.: 14/824,241

(22) Filed: Aug. 12, 2015

(65) Prior Publication Data
US 2017/0047864 A1 Feb. 16, 2017

(51) Int. Cl.
*G02B 7/02* (2006.01)
*H02N 2/02* (2006.01)
(Continued)

(52) U.S. Cl.
CPC ............. *H02N 2/026* (2013.01); *G02B 7/08* (2013.01); *G11B 7/0937* (2013.01); *H02N 2/025* (2013.01); *H02N 2/04* (2013.01)

(58) Field of Classification Search
CPC .. G02B 6/3564; G02B 6/3568; G02B 6/3656; G02B 6/366; G02B 7/08; G02B 7/102;
(Continued)

(56) References Cited

U.S. PATENT DOCUMENTS 6,832,725 B2   12/2004   Gardiner et al.
7,128,266 B2   10/2006   Zhu et al.
(Continued)

FOREIGN PATENT DOCUMENTS

JP    2011-134421 A       7/2011
JP    2011134421 A    *  7/2011
(Continued)

OTHER PUBLICATIONS

Extended European Search Report in counterpart European Application No. 16182482.6 dated Dec. 22, 2016, pp. 1-9.
(Continued)

*Primary Examiner* — Dawayne A Pinkney
*Assistant Examiner* — Mustak Choudhury
(74) *Attorney, Agent, or Firm* — Additon, Higgins & Pendleton, P.A.

(57) ABSTRACT

A linear actuator assembly has a linear actuator including a motor shaft extending from a base with a piezoelectric component oscillate the shaft. The shaft has a faceted surface. A movable carriage has a notch with at least one flat surface that receives the shaft of the linear actuator. The carriage is in direct and continuous contact with the motor shaft at the notch such that the motor shaft's facet is in contact with the flat surface of the notch, when the carriage moves linearly along a travel axis. A spring is coupled to the carriage to urge the motor shaft into contact with the notch of the carriage so as to maintain contact between the motor shaft facet and the flat surface of the notch to inhibit rotation of the motor shaft.

20 Claims, 3 Drawing Sheets

(51) Int. Cl.
  *G02B 7/08* (2006.01)
  *G11B 7/09* (2006.01)
  *H02N 2/04* (2006.01)

(58) Field of Classification Search
  CPC . G02B 7/04; H02N 2/00; H02N 2/025; H02N 2/026; H02N 2/02; H02N 2/0095; H02N 2/22
  USPC ............... 359/221.4, 254, 697, 823–827; 310/323.01–323.06, 309, 328; 348/340, 348/E5.024; 29/25.35
  See application file for complete search history.

(56) References Cited

U.S. PATENT DOCUMENTS

| | | |
|---|---|---|
| 7,159,783 B2 | 1/2007 | Walczyk et al. |
| 7,413,127 B2 | 8/2008 | Ehrhart et al. |
| 7,726,575 B2 | 6/2010 | Wang et al. |
| 7,826,734 B2 | 11/2010 | Shirono et al. |
| 8,294,969 B2 | 10/2012 | Plesko |
| 8,317,105 B2 | 11/2012 | Kotlarsky et al. |
| 8,322,622 B2 | 12/2012 | Liu |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,488,957 B2 | 7/2013 | Chiu et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,531,790 B2 | 9/2013 | Stang et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |

(56) References Cited

U.S. PATENT DOCUMENTS

| | | |
|---|---|---|
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 2002/0030422 A1 | 3/2002 | Hata |
| 2005/0029875 A1 | 2/2005 | Sasaki et al. |
| 2007/0063048 A1 | 3/2007 | Havens et al. |
| 2007/0223324 A1 | 9/2007 | Fujiwara |
| 2009/0072664 A1 | 3/2009 | Nagata et al. |
| 2009/0134221 A1 | 5/2009 | Zhu et al. |
| 2009/0161231 A1* | 6/2009 | Shiraki ............... G02B 7/102 359/697 |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0212844 A1* | 8/2012 | Stang ................ G02B 7/08 359/824 |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedrao |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Kearney |
| 2014/0121445 A1 | 5/2014 | Ding et al. |

(56) References Cited

U.S. PATENT DOCUMENTS

| | | |
|---|---|---|
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131441 A1 | 5/2014 | Nahill et al. |
| 2014/0131443 A1 | 5/2014 | Smith |
| 2014/0131444 A1 | 5/2014 | Wang |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071818 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chang et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |

FOREIGN PATENT DOCUMENTS

| | | |
|---|---|---|
| WO | 2013163789 A1 | 11/2013 |
| WO | 2013173985 A1 | 11/2013 |
| WO | 2014019130 A1 | 2/2014 |
| WO | 2014110495 A1 | 7/2014 |

OTHER PUBLICATIONS

U.S. Appl. No. 13/367,978, filed Feb. 7, 2012, (Feng et al.); now abandoned.

U.S. Appl. No. 14/462,801 for Mobile Computing Device With Data Cognition Software, filed Aug. 19, 2014 (Todeschini et al.); 38 pages.

U.S. Appl. No. 14/596,757 for System and Method for Detecting Barcode Printing Errors filed Jan. 14, 2015 (Ackley); 41 pages.

U.S. Appl. No. 14/277,337 for Multipurpose Optical Reader, filed May 14, 2014 (Jovanovski et al.); 59 pages.

U.S. Appl. No. 14/200,405 for Indicia Reader for Size-Limited Applications filed Mar. 7, 2014 (Feng et al.); 42 pages.

U.S. Appl. No. 14/662,922 for Multifunction Point of Sale System filed Mar. 19, 2015 (Van Horn et al.); 41 pages.

U.S. Appl. No. 14/446,391 for Multifunction Point of Sale Apparatus With Optical Signature Capture filed Jul. 30, 2014 (Good et al.); 37 pages.

U.S. Appl. No. 29/528,165 for In-Counter Barcode Scanner filed May 27, 2015 (Oberpriller et al.); 13 pages.

U.S. Appl. No. 29/528,890 for Mobile Computer Housing filed Jun. 2, 2015 (Fitch et al.); 61 pages.

U.S. Appl. No. 14/614,796 for Cargo Apportionment Techniques filed Feb. 5, 2015 (Morton et al.); 56 pages.

U.S. Appl. No. 29/516,892 for Table Computer filed Feb. 6, 2015 (Bidwell et al.); 13 pages.

U.S. Appl. No. 29/523,098 for Handle for a Tablet Computer filed Apr. 7, 2015 (Bidwell et al.); 17 pages.

(56) References Cited

OTHER PUBLICATIONS

U.S. Appl. No. 14/578,627 for Safety System and Method filed Dec. 22, 2014 (Ackley et al.); 32 pages.
U.S. Appl. No. 14/573,022 for Dynamic Diagnostic Indicator Generation filed Dec. 17, 2014 (Goldsmith); 43 pages.
U.S. Appl. No. 14/529,857 for Barcode Reader With Security Features filed Oct. 31, 2014 (Todeschini et al.); 32 pages.
U.S. Appl. No. 14/519,195 for Handheld Dimensioning System With Feedback filed Oct. 21, 2014 (Laffargue et al.); 39 pp.
U.S. Appl. No. 14/519,211 for System and Method for Dimensioning filed Oct. 21, 2014 (Ackley et al.); 33 pages.
U.S. Appl. No. 14/519,233 for Handheld Dimensioner With Data-Quality Indication filed Oct. 21, 2014 (Laffargue et al.); 36 pages.
U.S. Appl. No. 14/533,319 for Barcode Scanning System Using Wearable Device With Embedded Camera filed Nov. 5, 2014 (Todeschini); 29 pages.
U.S. Appl. No. 14/748,446 for Cordless Indicia Reader With a Multifunction Coil for Wireless Charging and EAS Deactivation, filed Jun. 24, 2015 (Xie et al.); 34 pages.
U.S. Appl. No. 29/528,590 for Electronic Device filed May 29, 2015 (Fitch et al.); 9 pages.
U.S. Appl. No. 14/519,249 for Handheld Dimensioning System With Measurement-Conformance Feedback filed Oct. 21, 2014 (Ackley et al.); 36 pages.
U.S. Appl. No. 29/519,017 for Scanner filed Mar. 2, 2015 (Zhou et al.); 11 pages.
U.S. Appl. No. 14/398,542 for Portable Electronic Devices Having a Separate Location Trigger Unit for Use in Controlling an Application Unit filed Nov. 3, 2014 (Bian et al.); 22 pages.
U.S. Appl. No. 14/405,278 for Design Pattern for Secure Store filed Mar. 9, 2015 (Zhu et. al.); 23 pages.
U.S. Appl. No. 14/590,024 for Shelving and Package Locating Systems for Delivery Vehicles filed Jan. 6, 2015 (Payne); 31 pages.
U.S. Appl. No. 14/568,305 for Auto-Contrast Viewfinder for an Indicia Reader filed Dec. 12, 2014 (Todeschini); 29 pages.
U.S. Appl. No. 29/526,918 for Charging Base filed May 14, 2015 (Fitch et al.); 10 pages.
U.S. Appl. No. 14/580,262 for Media Gate for Thermal Transfer Printers filed Dec. 23, 2014 (Bowles); 36 pages.
Vex Robotics, "Vex Square Bar Shafts—Vex Robotics" downloaded from http://www.vexrobotics.com/shafts.html, Nov. 25, 2014, pp. 1-2.
U.S. Appl. No. 14/519,179 for Dimensioning System With Multipath Interference Mitigation filed Oct. 21, 2014 (Thuries et al.); 30 pages.
U.S. Appl. No. 14/264,173 for Autofocus Lens System for Indicia Readers filed Apr. 29, 2014, (Ackley et al.); 39 pages.
U.S. Appl. No. 14/453,019 for Dimensioning System With Guided Alignment, filed Aug. 6, 2014 (Li et al.); 31 pages.
U.S. Appl. No. 14/452,697 for Interactive Indicia Reader , filed Aug. 6, 2014, (Todeschini); 32 pages.
U.S. Appl. No. 14/231,898 for Hand-Mounted Indicia-Reading Device with Finger Motion Triggering filed Apr. 1, 2014 (Van Horn et al.); 36 pages.
U.S. Appl. No. 14/715,916 for Evaluating Image Values filed May 19, 2015 (Ackley); 60 pages.
U.S. Appl. No. 14/513,808 for Identifying Inventory Items in a Storage Facility filed Oct. 14, 2014 (Singel et al.); 51 pages
U.S. Appl. No. 29/458,405 for an Electronic Device, filed Jun. 19, 2013 (Fitch et al.); 22 pages.
U.S. Appl. No. 29/459,620 for an Electronic Device Enclosure, filed Jul. 2, 2013 (London et al.); 21 pages.
U.S. Appl. No. 14/483,056 for Variable Depth of Field Barcode Scanner filed Sep. 10, 2014 (McCloskey et al.); 29 pages.
U.S. Appl. No. 14/531,154 for Directing an Inspector Through an Inspection filed Nov. 3, 2014 (Miller et al.); 53 pages.
U.S. Appl. No. 29/525,068 for Tablet Computer With Removable Scanning Device filed Apr. 27, 2015 (Schulte et al.); 19 pages.
U.S. Appl. No. 29/468,118 for an Electronic Device Case, filed Sep. 26, 2013 (Oberpriller et al.); 44 pages.
U.S. Appl. No. 14/340,627 for an Axially Reinforced Flexible Scan Element, filed Jul. 25, 2014 (Reublinger et al.); 41 pages.
U.S. Appl. No. 14/676,327 for Device Management Proxy for Secure Devices filed Apr. 1, 2015 (Yeakley et al.); 50 pages.
U.S. Appl. No. 14/257,364 for Docking System and Method Using Near Field Communication filed Apr. 21, 2014 (Showering); 31 pages.
U.S. Appl. No. 14/327,827 for a Mobile-Phone Adapter for Electronic Transactions, filed Jul. 10, 2014 (Hejl); 25 pages.
U.S. Appl. No. 14/334,934 for a System and Method for Indicia Verification, filed Jul. 18, 2014 (Hejl); 38 pages.
U.S. Appl. No. 29/530,600 for Cyclone filed Jun. 18, 2015 (Vargo et al); 16 pages.
U.S. Appl. No. 14/707,123 for Application Independent DEX/UCS Interface filed May 8, 2015 (Pape); 47 pages.
U.S. Appl. No. 14/283,282 for Terminal Having Illumination and Focus Control filed May 21, 2014 (Liu et al.); 31 pages.
U.S. Appl. No. 14/619,093 for Methods for Training a Speech Recognition System filed Feb. 11, 2015 (Pecorari); 35 pages.
U.S. Appl. No. 29/524,186 for Scanner filed Apr. 17, 2015 (Zhou et al.); 17 pages.
U.S. Appl. No. 14/705,407 for Method and System to Protect Software-Based Network-Connected Devices From Advanced Persistent Threat filed May 6, 2015 (Hussey et al.); 42 pages.
U.S. Appl. No. 14/614,706 for Device for Supporting an Electronic Tool on a User's Hand filed Feb. 5, 2015 (Oberpriller et al.); 33 pages.
U.S. Appl. No. 14/628,708 for Device, System, and Method for Determining the Status of Checkout Lanes filed Feb. 23, 2015 (Todeschini); 37 pages.
U.S. Appl. No. 14/704,050 for Intermediate Linear Positioning filed May 5, 2015 (Charpentier et al.); 60 pages.
U.S. Appl. No. 14/529,563 for Adaptable Interface for a Mobile Computing Device filed Oct. 31, 2014 (Schoon et al.); 36 pages.
U.S. Appl. No. 14/705,012 for Hands-Free Human Machine Interface Responsive to a Driver of a Vehicle filed May 6, 2015 (Fitch et al.); 44 pages.
U.S. Appl. No. 14/715,672 for Augumented Reality Enabled Hazard Display filed May 19, 2015 (Venkatesha et al.); 35 pages.
U.S. Appl. No. 14/695,364 for Medication Management System filed Apr. 24, 2015 (Sewell et al.); 44 pages.
U.S. Appl. No. 14/664,063 for Method and Application for Scanning a Barcode With a Smart Device While Continuously Running and Displaying an Application on the Smart Device Display filed Mar. 20, 2015 (Todeschini); 37 pages.
U.S. Appl. No. 14/735,717 for Indicia-Reading Systems Having an Interface With a User's Nervous System filed Jun. 10, 2015 (Todeschini); 39 pages.
U.S. Appl. No. 14/527,191 for Method and System for Recognizing Speech Using Wildcards in an Expected Response filed Oct. 29, 2014 (Braho et al.); 45 pages.
U.S. Appl. No. 14/702,110 for System and Method for Regulating Barcode Data Injection Into a Running Application on a Smart Device filed May 1, 2015 (Todeschini et al.); 38 pages.
U.S. Appl. No. 14/535,764 for Concatenated Expected Responses for Speech Recognition filed Nov. 7, 2014 (Braho et al.); 51 pages.
U.S. Appl. No. 14/687,289 for System for Communication via a Peripheral Hub filed Apr. 15, 2015 (Kohtz et al.); 37 pages.
U.S. Appl. No. 14/747,197 for Optical Pattern Projector filed Jun. 23, 2015 (Thuries et al.); 33 pages.
U.S. Appl. No. 14/674,329 for Aimer for Barcode Scanning filed Mar. 31, 2015 (Bidwell); 36 pages.
U.S. Appl. No. 14/702,979 for Tracking Battery Conditions filed May 4, 2015 (Young et al.); 70 pages.
U.S. Appl. No. 29/529,441 for Indicia Reading Device filed Jun. 8, 2015 (Zhou et al.); 14 pages.
U.S. Appl. No. 14/747,490 for Dual-Projector Three-Dimensional Scanner filed Jun. 23, 2015 (Jovanovski et al.); 40 pages.
U.S. Appl. No. 14/740,320 for Tactile Switch for a Mobile Electronic Device filed Jun. 16, 2015 (Barndringa); 38 pages.
U.S. Appl. No. 14/695,923 for Secure Unattended Network Authentication filed Apr. 24, 2015 (Kubler et al.); 52 pages.

(56) References Cited

OTHER PUBLICATIONS

U.S. Appl. No. 14/740,373 for Calibrating a Volume Dimensioner filed Jun. 16, 2015 (Ackley et al.); 63 pages.

* cited by examiner

ANGULAR MOTOR SHAFT WITH ROTATIONAL ATTENUATION

FIELD OF THE INVENTION

The present invention generally relates to positioning devices, and more particularly to positioning devices including linear actuators for high precision positioning of movable components, such as, for example, positioning of a lens within an imaging apparatus.

BACKGROUND

Generally speaking, modern imaging apparatuses (e.g., machine-readable symbol readers, video cameras, digital cameras, camera cell phones, smart phones and personal digital assistants) typically include one or more lenses that may be moved in order to zoom, focus, change depth of field, and capture a desired image by focusing the image on an image pickup device (e.g., charged-coupled devices, CMOS imager). One or more piezoelectric motors such as those described in U.S. Pat. No. 8,531,790 (which is hereby incorporated by reference) is one such piezoelectric motor that can be used for this purpose. This design exhibits excellent performance but is somewhat bulky and costly for certain applications.

Consequently, smaller and less expensive devices are desirable.

SUMMARY

Accordingly, in one aspect, the present invention embraces linear actuator assemblies and methods for the efficient and accurate positioning of movable components. In various embodiments, the linear actuator assemblies are particularly well adapted for positioning a movable carriage (e.g., carrying a lens for a scanner device) in a highly accurate manner by maintaining direct and continuous contact between the carriage having an angular notch and a shaft of the linear actuator that is faceted so as to have at least one surface in contact with the angular notch.

In an example embodiment, a linear actuator assembly has a linear actuator including a motor shaft extending from a base with a piezoelectric component oscillate the shaft. The shaft has a faceted surface. A movable carriage has a notch with at least one flat surface that receives the shaft of the linear actuator. The carriage is in direct and continuous contact with the motor shaft at the notch such that the motor shaft's facet is in contact with the flat surface of the notch, when the carriage moves linearly along a travel axis. A spring is coupled to the carriage to urge the motor shaft into contact with the notch of the carriage so as to maintain contact between the motor shaft facet and the flat surface of the notch to inhibit rotation of the motor shaft.

In certain example embodiments, a linear actuator assembly has a linear actuator, the linear actuator including a motor shaft extending from a base. The base includes a piezoelectric component to selectively oscillate the motor shaft. The motor shaft has a faceted surface such that when viewed in cross-section at least a portion of the cross section includes a straight line. A movable carriage includes a notch to receive the motor shaft, where the notch has at least one flat surface. The carriage is in direct and continuous contact with the motor shaft at the notch such that the motor shaft's facet is in contact with the flat surface of the notch, when the carriage moves linearly along a travel axis. A spring is coupled to the carriage to urge the motor shaft into contact with the notch of the carriage so as to maintain contact between the motor shaft facet and the flat surface of the notch to inhibit rotation of the motor shaft.

In certain example embodiments, the spring is a flat cantilever spring coupled to the carriage remote from the notch. In certain example embodiments, the notch is approximately V-shaped. In certain example embodiments, the motor shaft has a plurality of faceted surfaces, and where the notch has a plurality of flat surfaces that are in contact with the plurality of faceted surfaces of the shaft. In certain example embodiments, the notch is approximately V-shaped and the motor shaft has an approximately square cross-section. In certain example embodiments, the motor shaft has an approximately square cross-section with rounded corners. In certain example embodiments, the piezoelectric component is coupled to a flex circuit and where electrical signals are carried by the flex circuit to selectively cause the piezoelectric component to oscillate. In certain example embodiments, the linear actuator also has an optical lens coupled to the carriage to move linearly therewith. In certain example embodiments, the piezoelectric component is driven to oscillate at an ultrasonic frequency.

In other example embodiments, a linear actuator assembly has a linear actuator, the linear actuator including a motor shaft extending from a base. The base includes a piezoelectric component with a flex circuit electrically coupled to the piezoelectric component. Electrical signals are carried by the flex circuit to selectively cause the piezoelectric element to oscillate the motor shaft. The motor shaft is approximately square having four facets when viewed in cross-section. A movable carriage includes a notch to receive the motor shaft, where the notch is approximately V-shaped having two flat surfaces. The carriage is in direct and continuous contact with the motor shaft at the notch such that two of the motor shaft's facets are in contact with the two flat surfaces of the approximately V-shaped notch, when the carriage moves linearly along a travel axis. A cantilever spring, e.g., a flat cantilever spring, is coupled to the carriage to urge two of the motor shaft's facets into contact with the two flat surfaces of the V-shaped notch of the carriage so as to maintain contact between the motor shaft facets and the flat surfaces of the notch to inhibit rotation of the motor shaft.

In certain example embodiments, the motor shaft can have an approximately square cross-section with rounded corners. In certain example embodiments, an optical lens is coupled to the carriage to move linearly therewith. In certain example embodiments, the piezoelectric component is driven to oscillate at an ultrasonic frequency.

In other example embodiments, an autofocus imager, incorporates a linear actuator, the linear actuator including a motor shaft extending from a base. The base has a piezoelectric component to selectively oscillate the motor shaft. The motor shaft has a faceted surface such that when viewed in cross-section at least a portion of the cross section includes a straight line. A movable carriage includes a notch to receive the motor shaft, where the notch has at least one flat surface. The carriage is in direct and continuous contact with the motor shaft at the notch such that the motor shaft's facet is in contact with the flat surface of the notch, when the carriage moves linearly along a travel axis. A spring is coupled to the carriage to urge the motor shaft into contact with the notch of the carriage so as to maintain contact between the motor shaft facet and the flat surface of the notch to inhibit rotation of the motor shaft. A lens is coupled to the carriage to move linearly with the linear actuator to adjust a focus of the autofocus imager.

In certain example embodiments, the linear actuator comprises an ultrasonic linear actuator. In certain example embodiments, the linear actuator assembly includes a chassis and a plurality of elastomeric bushings, at least one elastomeric bushing coupled to the chassis to receive the linear actuator. In certain example embodiments, the spring includes a flat cantilever spring coupled to the carriage remote from the notch. In certain example embodiments, the motor shaft has a plurality of faceted surfaces, and where the notch has a plurality of flat surfaces that are in contact with the plurality of faceted surfaces of the shaft. In certain example embodiments, the notch is approximately V-shaped and where the motor shaft has an approximately square cross-section. In certain example embodiments, the piezoelectric component is driven to oscillate at an ultrasonic frequency.

A linear actuator assembly consistent with the present examples may have a linear actuator including a motor shaft extending from a base with a piezoelectric component oscillate the shaft. The shaft has a faceted surface. A movable carriage has a notch with at least one flat surface that receives the shaft of the linear actuator. The carriage is in direct and continuous contact with the motor shaft at the notch such that the motor shaft's facet is in contact with the flat surface of the notch, when the carriage moves linearly along a travel axis. A spring is coupled to the carriage to urge the motor shaft into contact with the notch of the carriage so as to maintain contact between the motor shaft facet and the flat surface of the notch to inhibit rotation of the motor shaft.

The linear actuator assemblies and methods described herein provide for the efficient and accurate positioning of movable components at low cost, weight and size. In various embodiments, the linear actuator assemblies are particularly well adapted for positioning a movable carriage in a highly accurate manner for adjustment of focus of a lens.

The foregoing illustrative summary, as well as other exemplary objectives and/or advantages of the invention, and the manner in which the same are accomplished, are further explained within the following detailed description and its accompanying drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details. In other instances, well-known structures and manufacturing techniques associated with positioning devices, imaging apparatuses, and piezoelectric motors and control systems therefor may not be shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

As used herein, the term "facet" is intended to mean a flat surface. Thus, a facet in a shaft means that the shaft has a flattened surface on the length thereof when viewed in cross-section. Other surfaces of the shaft may also be faceted or may be curved. By this definition, a D-shaped shaft (in cross-section) has a single facet while a hexagonal shaft (in cross-section) has six facets, for example.

Figure 1:
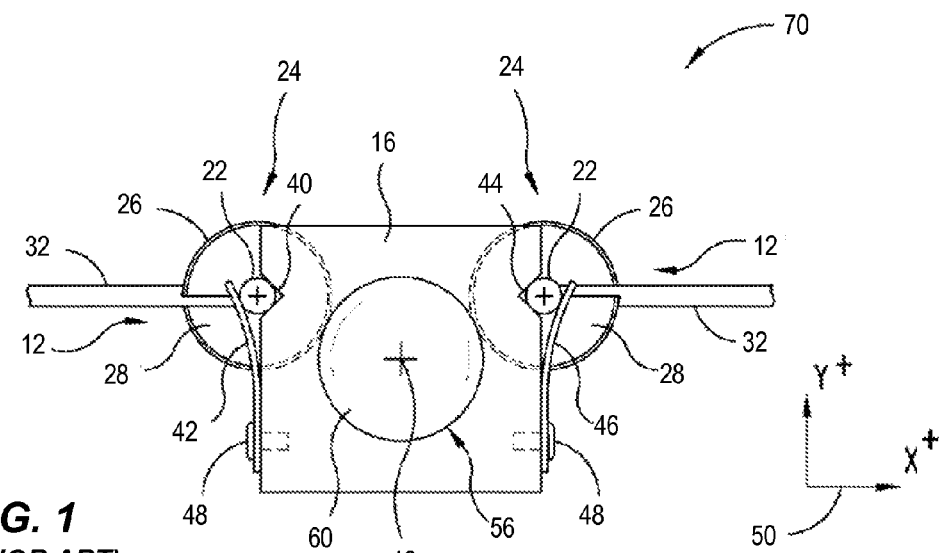
FIG. 1 is a front elevational view of a linear actuator assembly.
Figure 2:
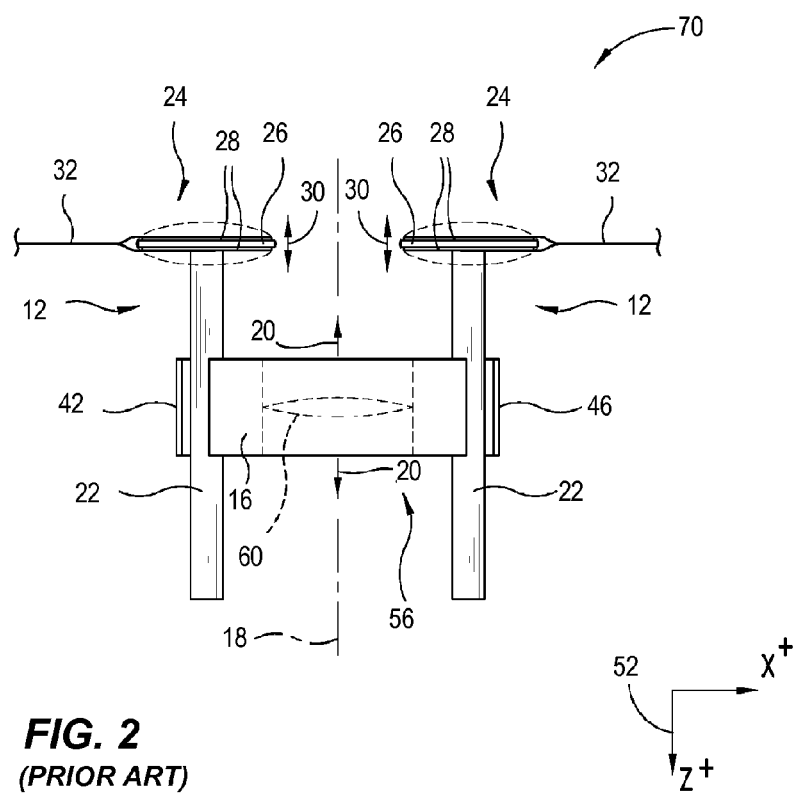
FIG. 2 is a top plan view of the linear actuator assembly of FIG. 1.

FIGS. 1 and 2 show an example linear actuator assembly 70 used to linearly move a lens to focus the lens. The linear actuator assembly 70 includes a pair of linear actuators 12, and a movable carriage 16. The carriage 16 is positioned between the two linear actuators 12 and remains in sliding contact with each as the linear actuators 12 moves the carriage 16 back and forth along a travel axis 18 during operation, as indicated by the arrow labeled 20.

The linear actuator 12 includes an elongated guide in the form of a dynamic cylindrical rod 22 extending from a base 24 thereof. The base 24 includes an actuator in the form of an elastic disc portion 26 and piezoelectric components 28 which deflect in response to an applied electrical current or voltage, as indicated by the arrows labeled 30. An electrical conductor, for example, in the form of a flex circuit 32 is electrically coupled to the linear actuator 12 to selectively apply an electric field to the piezoelectric components 28, and thus selectively deflect or oscillate the same. The rate of deflection or oscillation may be controlled such that the rods 22 accelerate and decelerate at different rates. In doing so, the rod 22 and the carriage 16 move together during relatively slow accelerations and decelerations due to friction between the rods 22 and the carriage 16.

Conversely, during relatively fast accelerations and decelerations, the rods 22 may slide along a surface of the carriage 16 due to the inertia of the carriage 16 which prevents the carriage 16 from moving with the rod 22. Consequently, the carriage 16 can be incrementally advanced back and forth along the rods 22 by controlling the rate of acceleration and deceleration of the rods 22 caused by deflections or oscillations of the piezoelectric components 28. For example, the rods 22 may initially extend forward relatively slowly moving the carriage 16 with it and then retract relatively quickly leaving the carriage 16 at an advanced position. Repeating this process moves the carriage 16 along the travel axis 18 in one direction. Reversing the process moves the carriage 16 along the travel axis 18 in the opposite direction. In some embodiments, the rods 22 can be driven to oscillate or reciprocate, for example, at ultrasonic frequencies (e.g., above approximately 20 kHz). Accordingly, the linear actuator 12 may be an ultrasonic linear actuator.

The carriage 16 includes a first V-shape notch 40 sized to receive the rod 22 of the linear actuator 12. A spring 42 is secured to the carriage 16 and positioned to urge the rod 22 of the linear actuator 12 into the first V-shape notch 40 such the rod 22 is held in direct and continuous contact with the carriage 16 during operation of the linear actuator assembly 10. The carriage 16 further includes a second V-shape notch 44 sized to receive the other rod 22. Another spring 46 is secured to the carriage 16 and positioned to urge the rod 22 into the V-shape notch 44 such the other rod 22 is also held in direct and continuous contact with the carriage 16 during operation of the linear actuator assembly 70. The springs 42 and 46 of FIGS. 1 and 2 are attached to the carriage 16 by fasteners 48 and may be used to bias the linear actuators 12 and rods 22 towards the carriage 16.

In operation, control circuitry and related components which are not described in detail herein to avoid unnecessarily obscuring descriptions of the embodiments, may be used to control the linear actuators 12 and selectively drive the carriage 16 back and forth along the travel axis 18. Throughout operation, the linear actuators 12 are held in direct and continuous contact with the carriage 16 such that no gaps exist between these components. As such, the carriage 16 is restrained with respect to movement in an x-y reference plane 50, but the carriage 16 is able to translate in the z-direction as defined by a corresponding x-z reference plane 52. This prevents rotation and/or displacement of the carriage 16 with respect to the x-y reference plane, and enables highly accurate repositioning of the carriage 16 along the travel axis 18.

The carriage 16 is illustrated as including a central cavity 56 which can be used, for example, to house components for movement about the travel axis 18 with respect to a host apparatus. For instance, an optical lens 60 may be secured within the cavity 56 of the carriage 16 for selective movement of the lens 60 along the travel axis 18. Thus, the linear actuator assembly 70 may be incorporated into a camera or other imaging device (e.g., handheld machine-readable symbol reader) to facilitate autofocus capabilities of those devices. Accordingly, an autofocus imager may be provided comprising the linear actuator assemblies described herein.

In this mechanism, a dynamic elongated cylindrical guide in the form of the second linear actuator 12 is coupled to the carriage 16 in parallel arrangement with the first linear actuator and is oriented in the same direction. The second linear actuators 12 may cooperate in unison to drive the carriage 16 back and forth along the travel axis 18.

While the mechanism shown in FIGS. 1 and 2 exhibits excellent performance, it may not be suitable for lower cost applications and the use of two linear actuators may occupy too much space for certain applications.

Figure 3:
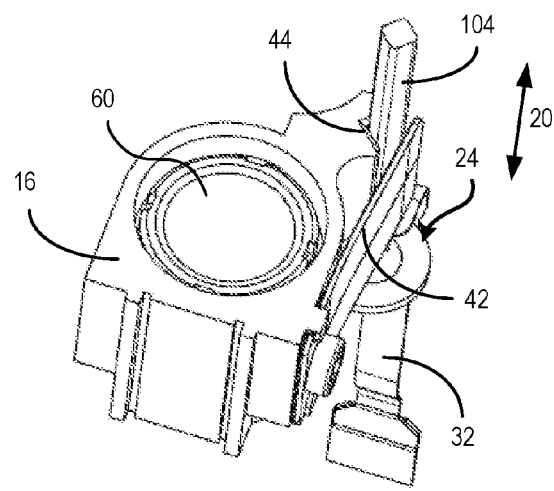
FIG. 3 is a first perspective view of an actuator assembly consistent with certain embodiments of the present invention.
Figure 4:
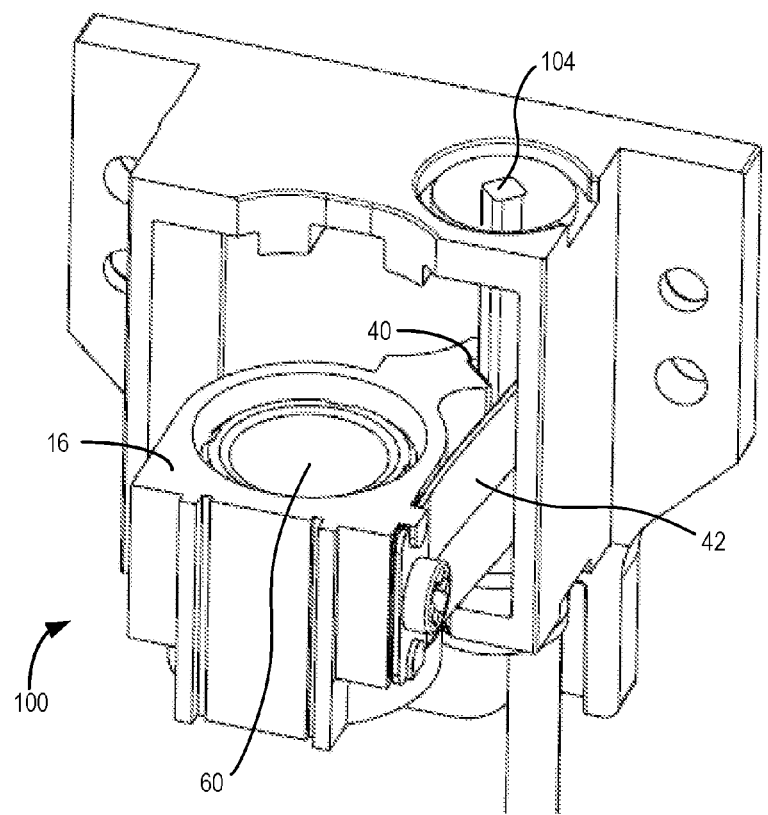
FIG. 4 is a second perspective view of an actuator assembly consistent with certain embodiments of the present invention.

Embodiments consistent with the present invention provide for size and cost reduction. In accord with certain embodiments of an assembly 100 as illustrated in FIGS. 3 and 4 a single motor having shaft 104 may be used with no other supports for the lens assembly (e.g., such as a passive guide shaft or second motor). But, without some way of stabilizing the lens assembly in the horizontal plane, it would be free to rotate about the motor shaft. A stabilizing guide shaft can be used, but introduces additional friction which reduces motor performance.

This problem is addressed by using a motor shaft that has a faceted profile that matches a V-shaped notch 40 in carriage 16. In this example, the motor shaft 104 can have an approximately square profile with sharp or rounded edges. This square shaft 104 solves this problem as depicted in FIGS. 3 and 4. Like the arrangement of FIGS. 1 and 2, this embodiment uses a V-shaped notch 44 in carriage 16 and shaft 104 is urged into the V-shaped notch by spring 42. But the cross-section of shaft 104 mates with the V-shaped notch to prevent rotation of the shaft 104. The carriage 16 is moved along the drive shaft along a travel direction 20 by application of an electrical signal to the piezoelectric element 28, e.g., via a flex circuit 32 or other set of electrical conductors do induce vibration that causes movement of the carriage 16 in relation to the shaft 104.

The linear actuator assembly may include a chassis and one or more elastomeric bushings. The elastomeric bushing can be coupled to the chassis to receive the linear actuator.

In an exemplary embodiment, the assembly is used to move the optical lens 60 in a linear motion in order to focus the lens. The linear actuator include motor shaft 104 which extends from a base 24 thereof. As in the arrangement of FIGS. 1 and 2, the base 24 includes an actuator in the form of an elastic disc portion 26 and piezoelectric components 28 (not shown in this figure) which deflect in response to an applied electrical current or voltage. An electrical conductor, for example, in the form of a flex circuit 32 is electrically coupled to the linear actuator 12 to selectively apply an electric field to the piezoelectric components, and thus selectively deflect or oscillate the same. The rate of deflection or oscillation may be controlled such that the motor shaft accelerate and decelerate at different rates. In doing so, the motor shaft 104 and the carriage 16 move together during relatively slow accelerations and decelerations due to friction between the motor shaft 104 and the notch 40 in the carriage 16.

Conversely, during relatively fast accelerations and decelerations, the motor shaft 104 may slide along the flat surface of the notch 40 in the carriage 16 due to the inertia of the carriage 16 which prevents the carriage 16 from moving with the motor shaft 104. Consequently, the carriage 16 can be incrementally advanced back and forth along the motor shaft 104 by controlling the rate of acceleration and deceleration of the motor shaft 104 caused by deflections or oscillations of the piezoelectric components. For example, the motor shaft 104 may initially extend forward relatively slowly moving the carriage 16 with it and then retract relatively quickly leaving the carriage 16 at an advanced position. Repeating this process moves the carriage 16 along the travel axis in direction 20 in one direction. Reversing the process moves the carriage 16 along the travel axis in direction 20 in the opposite direction. In some embodiments, the motor shaft 104 can be driven to oscillate or reciprocate, for example, at ultrasonic frequencies (e.g., above approximately 20 kHz). Accordingly, the linear actuator may be an ultrasonic linear actuator.

In the embodiment shown if FIGS. 3 and 4, an approximately square cross-sectional shaft 104 with rounded corners is used. This shaft mates with the triangular notch 40 at two of the four facets of the shaft 104. It is desirable to minimize friction, so it is desirable to minimize the number of surfaces and facets and surface to surface contact area to accomplish this. Additionally, a lubricant such as a dry lubricant can be used to further reduce friction. The shaft 104 can be fabricated by extruding carbon fibers. The carriage may be made of a magnesium alloy, for example, and may include a PAO surface treatment, but these details are not to be considered limiting.

In the embodiment of FIGS. 3 and 4, good performance can be achieved. The square shaft with rounded corners is easily fabricated at low cost and the V-shaped notch can be the same notch used in assemblies such as those shown in FIGS. 1 and 2 thus requiring no retooling. That notwithstanding, many shaft and notch shapes could be used to accomplish the objective of inhibiting shaft rotation.

Figure 5:
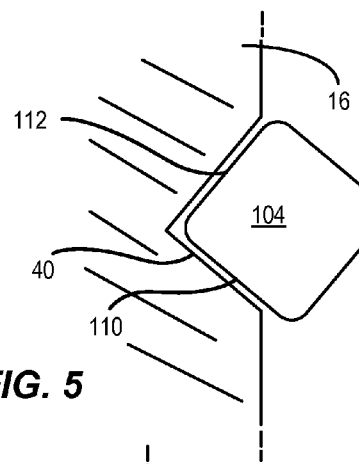
FIG. 5 is a detail view of an embodiment using an approximately square motor shaft with rounded corners seated within a triangular notch in the carriage in a manner consistent with the present teachings.
Figure 6:
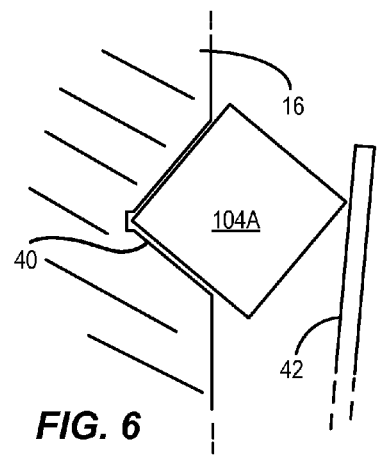
FIG. 6 is a detail view of an embodiment using an approximately square motor shaft seated within a triangular notch in the carriage in a manner consistent with the present teachings.
Figure 7:
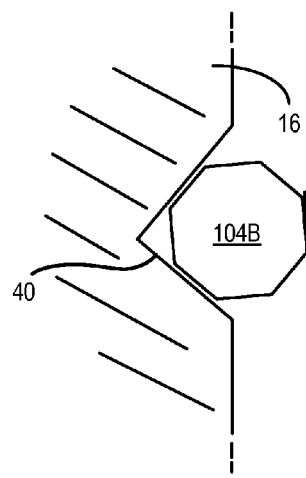
FIG. 7 is a detail view of an embodiment using an approximately octagonal motor shaft seated within a triangular notch in the carriage in a manner consistent with the present teachings.
Figure 8:
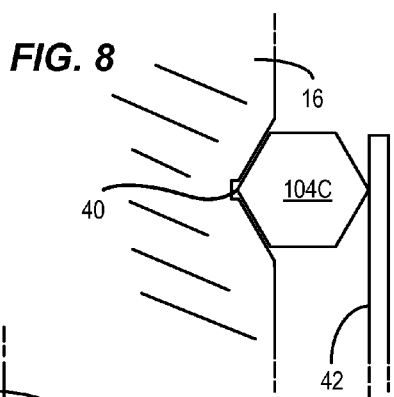
FIG. 8 is a detail view of an embodiment using an approximately hexagonal motor shaft seated within a triangular notch in the carriage in a manner consistent with the present teachings.

Referring to FIG. 5, the shaft 104 is shown in cross section mated to the V-shaped notch 40 of the carriage 16. In this embodiment, the shaft is square with rounded corners and thus has four facets (four sides) along the length thereof. The spring 42 urges the facets 110 and 112 into contact with the two surfaces of the V-shaped notch 40, thereby allowing the motor shaft 110 to slide in the notch 40 in response to the oscillations of the piezoelectric element but is prevented from rotating within the notch.

Figure 9:
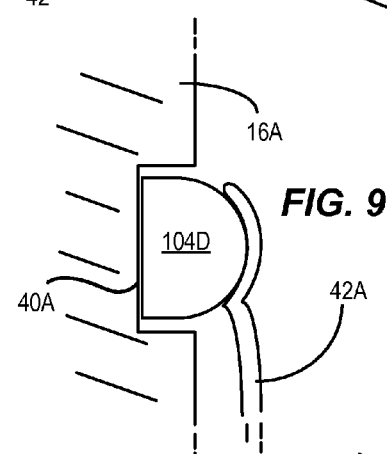
FIG. 9 is a detail view of an embodiment using an approximately D-shaped motor shaft seated within a rectangular notch in the carriage in a manner consistent with the present teachings.
Figure 10:
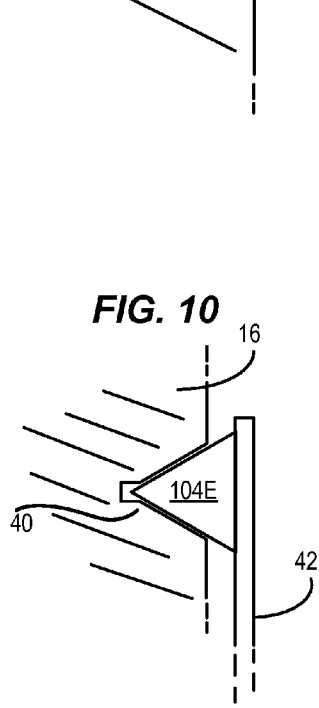
FIG. 10 is a detail view of an embodiment using an approximately triangular motor shaft seated within a triangular notch in the carriage in a manner consistent with the present teachings.

FIGS. 6 through 11 show several illustrative examples of other shaft and notch arrangements. FIGS. 6, 7, 8 and 10 show variations in the cross-section of the motor shaft (square 104A, octagonal 104B, hexagonal 104C, and triangular 104E respectively) which mate with an approximately V-shaped notch 40 to place a pair of facets of the motor shaft in contact with both flat surfaces of the V-shaped notch. The bottom of the V-Shaped notch 40 may be cut back as depicted in order to provide relief that allows the various shafts to properly seat with facets in contact with the V-Shaped side walls. FIG. 9 shows an example embodiment in which a single facet of a D-shaped shaft 104D resides within a rectangular notch 40A such that the single facet of the D-shape is urged into contact with the bottom of the rectangular notch 40A. The rectangular notch 40A can be somewhat oversized and the shaft 42A can be adapted to conform to the shape of the shaft to prevent translation of the part (up and down as shown). The side surfaces of the rectangular notch 40A limit movement up and down (as shown in this illustration) while the contact between the facet of the D-shaped motor shaft is urged against the bottom (left as illustrated) of the rectangular notch to inhibit rotation.

Figure 11:
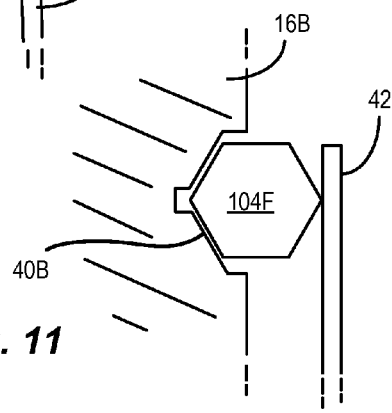
FIG. 11 is a detail view of an embodiment using an approximately hexagonal motor shaft seated within a notch in the carriage having four flat surfaces in a manner consistent with the present teachings.

FIG. 11 depicts another variation in which the motor shaft 104F is approximately hexagonal in shape and the notch 40B has surfaces that are angular to conform fully with two facets (leftmost as illustrated) of the hexagonal cross-section of the motor shaft and partially conforms to two more of the facets of the hexagonal motor shaft (top and bottom as illustrated). This locks the shaft into place under the urging of the spring 42 and inhibits rotation if the motor shaft 104F. In this example, the V-Shaped slot 42 may also be relieved at the center as well as cut back at the upper and lower sides (as shown) to reduce the amount of surface area of contact with the shaft thereby minimizing friction.

Any of the notches or slots having relief cutaways in which the predominant profile of the slot is V-Shaped may be considered approximately V-Shaped for purposes of this document.

In each example, the motor shaft has at least one facet that rides along a flat surface of a notch in the carriage, but multiple facets may ride along multiple corresponding surfaces of a notch to inhibit rotation of the motor shaft.

A method of making a linear actuator assembly in a manner consistent with the present teachings involves providing a linear actuator including a faceted motor shaft extending from a base, the base of the linear actuator including a piezoelectric component to selectively oscillate the rod of the first linear actuator. A movable carriage is disposed such that the faceted motor shaft is within a notch of the carriage, where the notch has at least one flat surface such that at least one facet of the motor shaft is in direct and continuous contact with at least one flat surface of the notch. The motor shaft is secured in place with a spring such as a cantilever spring 42. The linear actuator can be coupled to a chassis with at least one elastomeric bushing.

Compared to the assembly of FIGS. 1 and 2, a cost savings of about 40% can be achieved. Additionally, weight savings and size reduction is also possible. Since only one motor is used, the current can be reduced compared with two motors. In the alternative, the speed can be increased by increasing the current to the single motor while maintain an equal or lower overall power consumption. The use of the faceted motor shaft such as one with a square cross-section, allows for resistance to rotation without reduction in performance.

To supplement the present disclosure, this application incorporates entirely by reference the following commonly assigned patents, patent application publications, and patent applications:

U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;
U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,818; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;
U.S. Pat. No. 8,556,176; U.S. Pat. No. 8,556,177;
U.S. Pat. No. 8,559,767; U.S. Pat. No. 8,599,957;
U.S. Pat. No. 8,561,895; U.S. Pat. No. 8,561,903;
U.S. Pat. No. 8,561,905; U.S. Pat. No. 8,565,107;
U.S. Pat. No. 8,571,307; U.S. Pat. No. 8,579,200;

U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;
U.S. Pat. No. 8,596,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;
U.S. Pat. No. 8,600,167; U.S. Pat. No. 8,602,309;
U.S. Pat. No. 8,608,053; U.S. Pat. No. 8,608,071;
U.S. Pat. No. 8,611,309; U.S. Pat. No. 8,615,487;
U.S. Pat. No. 8,616,454; U.S. Pat. No. 8,621,123;
U.S. Pat. No. 8,622,303; U.S. Pat. No. 8,628,013;
U.S. Pat. No. 8,628,015; U.S. Pat. No. 8,628,016;
U.S. Pat. No. 8,629,926; U.S. Pat. No. 8,630,491;
U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;
U.S. Pat. No. 8,643,717; U.S. Pat. No. 8,646,692;
U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
U.S. Pat. No. 8,692,927; U.S. Pat. No. 8,695,880;
U.S. Pat. No. 8,698,949; U.S. Pat. No. 8,717,494;
U.S. Pat. No. 8,717,494; U.S. Pat. No. 8,720,783;
U.S. Pat. No. 8,723,804; U.S. Pat. No. 8,723,904;
U.S. Pat. No. 8,727,223; U.S. Pat. No. D702,237;
U.S. Pat. No. 8,740,082; U.S. Pat. No. 8,740,085;
U.S. Pat. No. 8,746,563; U.S. Pat. No. 8,750,445;
U.S. Pat. No. 8,752,766; U.S. Pat. No. 8,756,059;
U.S. Pat. No. 8,757,495; U.S. Pat. No. 8,760,563;
U.S. Pat. No. 8,763,909; U.S. Pat. No. 8,777,108;
U.S. Pat. No. 8,777,109; U.S. Pat. No. 8,779,898;
U.S. Pat. No. 8,781,520; U.S. Pat. No. 8,783,573;
U.S. Pat. No. 8,789,757; U.S. Pat. No. 8,789,758;
U.S. Pat. No. 8,789,759; U.S. Pat. No. 8,794,520;
U.S. Pat. No. 8,794,522; U.S. Pat. No. 8,794,526;
U.S. Pat. No. 8,798,367; U.S. Pat. No. 8,807,431;
U.S. Pat. No. 8,807,432; U.S. Pat. No. 8,820,630;
U.S. Pat. No. 8,531,790;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2011/0202554;
U.S. Patent Application Publication No. 2012/0111946;
U.S. Patent Application Publication No. 2012/0138685;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0056285;
U.S. Patent Application Publication No. 2013/0070322;
U.S. Patent Application Publication No. 2013/0075168;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0200158;
U.S. Patent Application Publication No. 2013/0256418;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0278425;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306730;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0341399;
U.S. Patent Application Publication No. 2013/0342717;
U.S. Patent Application Publication No. 2014/0001267;
U.S. Patent Application Publication No. 2014/0002828;
U.S. Patent Application Publication No. 2014/0008430;
U.S. Patent Application Publication No. 2014/0008439;
U.S. Patent Application Publication No. 2014/0025584;
U.S. Patent Application Publication No. 2014/0027518;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061305;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0075846;
U.S. Patent Application Publication No. 2014/0076974;
U.S. Patent Application Publication No. 2014/0078341;
U.S. Patent Application Publication No. 2014/0078342;
U.S. Patent Application Publication No. 2014/0078345;
U.S. Patent Application Publication No. 2014/0084068;
U.S. Patent Application Publication No. 2014/0097249;
U.S. Patent Application Publication No. 2014/0098792;
U.S. Patent Application Publication No. 2014/0100774;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0108682;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;

U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0160329;
U.S. Patent Application Publication No. 2014/0166755;
U.S. Patent Application Publication No. 2014/0166757;
U.S. Patent Application Publication No. 2014/0166759;
U.S. Patent Application Publication No. 2014/0166760;
U.S. Patent Application Publication No. 2014/0166761;
U.S. Patent Application Publication No. 2014/0168787;
U.S. Patent Application Publication No. 2014/0175165;
U.S. Patent Application Publication No. 2014/0175169;
U.S. Patent Application Publication No. 2014/0175172;
U.S. Patent Application Publication No. 2014/0175174;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0203087;
U.S. Patent Application Publication No. 2014/0204268;
U.S. Patent Application Publication No. 2014/0214631;
U.S. Patent Application Publication No. 2014/0217166;
U.S. Patent Application Publication No. 2014/0217180;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/436,337 for an Electronic Device, filed Nov. 5, 2012 (Fitch et al.);
U.S. patent application Ser. No. 13/771,508 for an Optical Redirection Adapter, filed Feb. 20, 2013 (Anderson);
U.S. patent application Ser. No. 13/852,097 for a System and Method for Capturing and Preserving Vehicle Event Data, filed Mar. 28, 2013 (Barker et al.);
U.S. patent application Ser. No. 13/902,110 for a System and Method for Display of Information Using a Vehicle-Mount Computer, filed May 24, 2013 (Hollifield);
U.S. patent application Ser. No. 13/902,144, for a System and Method for Display of Information Using a Vehicle-Mount Computer, filed May 24, 2013 (Chamberlin);
U.S. patent application Ser. No. 13/902,242 for a System For Providing A Continuous Communication Link With A Symbol Reading Device, filed May 24, 2013 (Smith et al.);
U.S. patent application Ser. No. 13/912,262 for a Method of Error Correction for 3D Imaging Device, filed Jun. 7, 2013 (Jovanovski et al.);
U.S. patent application Ser. No. 13/912,702 for a System and Method for Reading Code Symbols at Long Range Using Source Power Control, filed Jun. 7, 2013 (Xian et al.);
U.S. patent application Ser. No. 29/458,405 for an Electronic Device, filed Jun. 19, 2013 (Fitch et al.);
U.S. patent application Ser. No. 13/922,339 for a System and Method for Reading Code Symbols Using a Variable Field of View, filed Jun. 20, 2013 (Xian et al.);
U.S. patent application Ser. No. 13/927,398 for a Code Symbol Reading System Having Adaptive Autofocus, filed Jun. 26, 2013 (Todeschini);
U.S. patent application Ser. No. 13/930,913 for a Mobile Device Having an Improved User Interface for Reading Code Symbols, filed Jun. 28, 2013 (Gelay et al.);
U.S. patent application Ser. No. 29/459,620 for an Electronic Device Enclosure, filed Jul. 2, 2013 (London et al.);
U.S. patent application Ser. No. 29/459,681 for an Electronic Device Enclosure, filed Jul. 2, 2013 (Chaney et al.);
U.S. patent application Ser. No. 13/933,415 for an Electronic Device Case, filed Jul. 2, 2013 (London et al.);
U.S. patent application Ser. No. 29/459,785 for a Scanner and Charging Base, filed Jul. 3, 2013 (Fitch et al.);
U.S. patent application Ser. No. 29/459,823 for a Scanner, filed Jul. 3, 2013 (Zhou et al.);
U.S. patent application Ser. No. 13/947,296 for a System and Method for Selectively Reading Code Symbols, filed Jul. 22, 2013 (Rueblinger et al.);
U.S. patent application Ser. No. 13/950,544 for a Code Symbol Reading System Having Adjustable Object Detection, filed Jul. 25, 2013 (Jiang);
U.S. patent application Ser. No. 13/961,408 for a Method for Manufacturing Laser Scanners, filed Aug. 7, 2013 (Saber et al.);
U.S. patent application Ser. No. 14/018,729 for a Method for Operating a Laser Scanner, filed Sep. 5, 2013 (Feng et al.);
U.S. patent application Ser. No. 14/019,616 for a Device Having Light Source to Reduce Surface Pathogens, filed Sep. 6, 2013 (Todeschini);
U.S. patent application Ser. No. 14/023,762 for a Handheld Indicia Reader Having Locking Endcap, filed Sep. 11, 2013 (Gannon);
U.S. patent application Ser. No. 14/035,474 for Augmented-Reality Signature Capture, filed Sep. 24, 2013 (Todeschini);
U.S. patent application Ser. No. 29/468,118 for an Electronic Device Case, filed Sep. 26, 2013 (Oberpriller et al.);
U.S. patent application Ser. No. 14/055,234 for Dimensioning System, filed Oct. 16, 2013 (Fletcher);
U.S. patent application Ser. No. 14/053,314 for Indicia Reader, filed Oct. 14, 2013 (Huck);
U.S. patent application Ser. No. 14/065,768 for Hybrid System and Method for Reading Indicia, filed Oct. 29, 2013 (Meier et al.);
U.S. patent application Ser. No. 14/074,746 for Self-Checkout Shopping System, filed Nov. 8, 2013 (Hejl et al.);
U.S. patent application Ser. No. 14/074,787 for Method and System for Configuring Mobile Devices via NFC Technology, filed Nov. 8, 2013 (Smith et al.);
U.S. patent application Ser. No. 14/087,190 for Optimal Range Indicators for Bar Code Validation, filed Nov. 22, 2013 (Hejl);
U.S. patent application Ser. No. 14/094,087 for Method and System for Communicating Information in an Digital Signal, filed Dec. 2, 2013 (Peake et al.);
U.S. patent application Ser. No. 14/101,965 for High Dynamic-Range Indicia Reading System, filed Dec. 10, 2013 (Xian);
U.S. patent application Ser. No. 14/150,393 for Indicia-reader Having Unitary Construction Scanner, filed Jan. 8, 2014 (Colavito et al.);
U.S. patent application Ser. No. 14/154,207 for Laser Barcode Scanner, filed Jan. 14, 2014 (Hou et al.);
U.S. patent application Ser. No. 14/165,980 for System and Method for Measuring Irregular Objects with a Single Camera filed Jan. 28, 2014 (Li et al.);

U.S. patent application Ser. No. 14/166,103 for Indicia Reading Terminal Including Optical Filter filed Jan. 28, 2014 (Lu et al.);

U.S. patent application Ser. No. 14/200,405 for Indicia Reader for Size-Limited Applications filed Mar. 7, 2014 (Feng et al.);

U.S. patent application Ser. No. 14/231,898 for Hand-Mounted Indicia-Reading Device with Finger Motion Triggering filed Apr. 1, 2014 (Van Horn et al.);

U.S. patent application Ser. No. 14/250,923 for Reading Apparatus Having Partial Frame Operating Mode filed Apr. 11, 2014, (Deng et al.);

U.S. patent application Ser. No. 14/257,174 for Imaging Terminal Having Data Compression filed Apr. 21, 2014, (Barber et al.);

U.S. patent application Ser. No. 14/257,364 for Docking System and Method Using Near Field Communication filed Apr. 21, 2014 (Showering);

U.S. patent application Ser. No. 14/264,173 for Autofocus Lens System for Indicia Readers filed Apr. 29, 2014 (Ackley et al.);

U.S. patent application Ser. No. 14/274,858 for Mobile Printer with Optional Battery Accessory filed May 12, 2014 (Marty et al.);

U.S. patent application Ser. No. 14/277,337 for MULTI-PURPOSE OPTICAL READER, filed May 14, 2014 (Jovanovski et al.);

U.S. patent application Ser. No. 14/283,282 for TERMINAL HAVING ILLUMINATION AND FOCUS CONTROL filed May 21, 2014 (Liu et al.);

U.S. patent application Ser. No. 14/300,276 for METHOD AND SYSTEM FOR CONSIDERING INFORMATION ABOUT AN EXPECTED RESPONSE WHEN PERFORMING SPEECH RECOGNITION, filed Jun. 10, 2014 (Braho et al.);

U.S. patent application Ser. No. 14/305,153 for INDICIA READING SYSTEM EMPLOYING DIGITAL GAIN CONTROL filed Jun. 16, 2014 (Xian et al.);

U.S. patent application Ser. No. 14/310,226 for AUTOFOCUSING OPTICAL IMAGING DEVICE filed Jun. 20, 2014 (Koziol et al.);

U.S. patent application Ser. No. 14/327,722 for CUSTOMER FACING IMAGING SYSTEMS AND METHODS FOR OBTAINING IMAGES filed Jul. 10, 2014 (Oberpriller et al,);

U.S. patent application Ser. No. 14/327,827 for a MOBILE-PHONE ADAPTER FOR ELECTRONIC TRANSACTIONS, filed Jul. 10, 2014 (Hejl);

U.S. patent application Ser. No. 14/329,303 for CELL PHONE READING MODE USING IMAGE TIMER filed Jul. 11, 2014 (Coyle);

U.S. patent application Ser. No. 14/333,588 for SYMBOL READING SYSTEM WITH INTEGRATED SCALE BASE filed Jul. 17, 2014 (Barten);

U.S. patent application Ser. No. 14/334,934 for a SYSTEM AND METHOD FOR INDICIA VERIFICATION, filed Jul. 18, 2014 (Hejl);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Rueblinger et al.);

U.S. patent application Ser. No. 14/340,716 for an OPTICAL IMAGER AND METHOD FOR CORRELATING A MEDICATION PACKAGE WITH A PATIENT, filed Jul. 25, 2014 (Ellis);

U.S. patent application Ser. No. 14/342,544 for Imaging Based Barcode Scanner Engine with Multiple Elements Supported on a Common Printed Circuit Board filed Mar. 4, 2014 (Liu et al.);

U.S. patent application Ser. No. 14/345,735 for Optical Indicia Reading Terminal with Combined Illumination filed Mar. 19, 2014 (Ouyang);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/355,613 for Optical Indicia Reading Terminal with Color Image Sensor filed May 1, 2014 (Lu et al.);

U.S. patent application Ser. No. 14/370,237 for WEB-BASED SCAN-TASK ENABLED SYSTEM AND METHOD OF AND APPARATUS FOR DEVELOPING AND DEPLOYING THE SAME ON A CLIENT-SERVER NETWORK filed Jul. 2, 2014 (Chen et al.);

U.S. patent application Ser. No. 14/370,267 for INDUSTRIAL DESIGN FOR CONSUMER DEVICE BASED SCANNING AND MOBILITY, filed Jul. 2, 2014 (Ma et al.);

U.S. patent application Ser. No. 14/376,472, for an ENCODED INFORMATION READING TERMINAL INCLUDING HTTP SERVER, filed Aug. 4, 2014 (Lu);

U.S. patent application Ser. No. 14/379,057 for METHOD OF USING CAMERA SENSOR INTERFACE TO TRANSFER MULTIPLE CHANNELS OF SCAN DATA USING AN IMAGE FORMAT filed Aug. 15, 2014 (Wang et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/460,387 for APPARATUS FOR DISPLAYING BAR CODES FROM LIGHT EMITTING DISPLAY SURFACES filed Aug. 15, 2014 (Van Horn et al.);

U.S. patent application Ser. No. 14/460,829 for ENCODED INFORMATION READING TERMINAL WITH WIRELESS PATH SELECTION CAPABILITY, filed Aug. 15, 2014 (Wang et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/446,387 for INDICIA READING TERMINAL PROCESSING PLURALITY OF FRAMES OF IMAGE DATA RESPONSIVELY TO TRIGGER SIGNAL ACTIVATION filed Jul. 30, 2014 (Wang et al.);

U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. patent application Ser. No. 29/486,759 for an Imaging Terminal, filed Apr. 2, 2014 (Oberpriller et al.);

U.S. patent application Ser. No. 29/492,903 for an INDICIA SCANNER, filed Jun. 4, 2014 (Zhou et al.); and U.S. patent application Ser. No. 29/494,725 for an IN-COUNTER BARCODE SCANNER, filed Jun. 24, 2014 (Oberpriller et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A linear actuator assembly comprising: a linear actuator, the linear actuator including a single motor shaft extending from a base; the base including a piezoelectric component to selectively oscillate the motor shaft at an ultrasonic frequency; the motor shaft having a faceted surface which when viewed in cross-section at least a portion of the cross section includes a straight line; a movable carriage, the carriage including a notch to receive the motor shaft; where the notch has substantially a V-shape with at least one flat surface and a relief cutaway configured to reduce the amount of surface area contact between the motor shaft and the at least one flat surface; the carriage being in direct and continuous contact with the motor shaft at the notch wherein the motor shaft's facet is in contact with the flat surface of the notch, when the carriage moves linearly along a travel axis; and a spring assembly coupled to the carriage to urge the motor shaft into contact with the notch of the carriage so as to maintain contact between the motor shaft facet and the flat surface of the notch to inhibit rotation of the motor shaft, the spring assembly contacting the motor shaft at a facet corner configured to reduce the surface area contact between the motor shaft and the spring assembly; wherein the carriage is supported solely by contact with the motor shaft and the spring assembly.

2. The linear actuator assembly according to claim 1, where the spring comprises a flat cantilever spring coupled to the carriage remote from the notch.

3. The linear actuator assembly according to claim 1, where the notch is substantially V-shaped, and the motor shaft has a substantially triangle cross-section.

4. The linear actuator assembly according to claim 1, where the motor shaft has a plurality of faceted surfaces, and where the notch has a plurality of flat surfaces that are in contact with the plurality of faceted surfaces of the shaft.

5. The linear actuator assembly according to claim 1, where the notch is substantially V-shaped and where the motor shaft has a substantially square cross-section.

6. The linear actuator assembly according to claim 5, where the motor shaft has a substantially square cross-section with rounded corners.

7. The linear actuator assembly according to claim 1, where the piezoelectric component is coupled to a flex circuit and where electrical signals are carried by the flex circuit to selectively cause the piezoelectric component to oscillate.

8. The linear actuator assembly according to claim 1, further comprising:
an optical lens coupled to the carriage to move linearly therewith.

9. The linear actuator assembly according to claim 1, wherein the relief cutaway comprises a cut back around the bottom of the V-shaped notch.

10. A linear actuator assembly comprising: a linear actuator, the linear actuator including a single motor shaft extending from a base; the base including a piezoelectric component; a flex circuit electrically coupled to the piezoelectric component; where electrical signals are carried by the flex circuit to selectively cause the piezoelectric element to oscillate the motor shaft at an ultrasonic frequency; the motor shaft being substantially square having four facets when viewed in cross-section; a movable carriage, the carriage including a notch to receive the motor shaft; where the notch is substantially V-shaped having two flat surfaces and a relief cutaway configured to reduce the amount of surface area contact between the motor shaft and the at least one flat surface; the carriage being in direct and continuous contact with the motor shaft at the notch wherein two of the motor shaft's facets are in contact with the two flat surfaces of the V-shaped notch, when the carriage moves linearly along a travel axis; and a cantilever spring assembly coupled to the carriage to urge two of the motor shaft's facets into contact with the two flat surfaces of the substantially V-shaped notch of the carriage so as to maintain contact between the motor shaft facets and the flat surfaces of the notch to inhibit rotation of the motor shaft, the spring assembly contacting the motor shaft at a facet corner configured to reduce the surface area contact between the motor shaft and the spring assembly; wherein the carriage is supported solely by contact with the motor shaft and the spring assembly.

11. The linear actuator assembly according to claim 10, where the motor shaft has a substantially square cross-section with rounded corners.

12. The linear actuator assembly according to claim 10, further comprising:
an optical lens coupled to the carriage to move linearly therewith.

13. The linear actuator assembly according to claim 10, wherein the relief cutaway comprises cut back at the upper and lower sides of the V-shaped notch.

14. An autofocus imager comprising: a linear actuator, the linear actuator including a single motor shaft extending from a base; the base including a piezoelectric component to selectively oscillate the motor shaft at an ultrasonic frequency; the motor shaft having a faceted surface which when viewed in cross-section at least a portion of the cross section includes a straight line; a movable carriage, the carriage including a notch to receive the motor shaft; where the notch has substantially a V-shape with at least one flat surface and a relief cutaway configured to reduce the amount of surface area contact between the motor shaft and the at least one flat surface; the carriage being in direct and continuous contact with the motor shaft at the notch wherein the motor shaft's facet is in contact with the flat surface of the notch, when the carriage moves linearly along a travel axis; a spring assembly coupled to the carriage to urge the motor shaft into contact with the notch of the carriage so as to maintain contact between the motor shaft facet and the flat surface of the notch to inhibit rotation of the motor shaft, the spring assembly contacting the motor shaft at a facet corner configured to reduce the surface area contact between the motor shaft and the spring assembly; wherein the carriage is supported solely by contact with the motor shaft and the spring assembly; and a lens coupled to the carriage to move linearly with the linear actuator to adjust a focus of the autofocus imager.

15. The autofocus imager according to claim 14, where the linear actuator comprises an ultrasonic linear actuator.

16. The autofocus imager according to claim 14, where the linear actuator assembly includes a chassis and a plurality of elastomeric bushings, at least one elastomeric bushing coupled to the chassis to receive the linear actuator.

17. The autofocus imager according to claim 14, where the spring comprises a flat cantilever spring coupled to the carriage remote from the notch.

18. The autofocus imager according to claim 14, where the motor shaft has a plurality of faceted surfaces, and where the notch has a plurality of flat surfaces that are in contact with the plurality of faceted surfaces of the shaft.

19. The autofocus imager according to claim 14, where the notch is substantially V-shaped and where the motor shaft has a substantially square cross-section.

20. The autofocus imager according to claim 14, wherein the relief cutaway comprises a cut back around the bottom of the V-shaped notch.

\* \* \* \* \*